United States Patent
LeGendre et al.

(10) Patent No.: US 12,165,380 B2
(45) Date of Patent: Dec. 10, 2024

(54) DEEP LIGHT DESIGN

(71) Applicant: GOOGLE LLC, Mountain View, CA (US)

(72) Inventors: Chloe LeGendre, Culver City, CA (US); Wan-Chun Ma, Culver City, CA (US); Graham Fyffe, Los Angeles, CA (US); John Flynn, Los Angeles, CA (US); Jessica Busch, Gardena, CA (US); Paul Debevec, Culver City, CA (US)

(73) Assignee: GOOGLE LLC, Mountain View, CA (US)

( * ) Notice: Subject to any disclaimer, the term of this patent is extended or adjusted under 35 U.S.C. 154(b) by 412 days.

(21) Appl. No.: 17/309,206

(22) PCT Filed: Nov. 15, 2019

(86) PCT No.: PCT/US2019/061877
§ 371 (c)(1),
(2) Date: May 6, 2021

(87) PCT Pub. No.: WO2020/102771
PCT Pub. Date: May 22, 2020

(65) Prior Publication Data
US 2021/0406581 A1  Dec. 30, 2021

Related U.S. Application Data

(60) Provisional application No. 62/768,042, filed on Nov. 15, 2018.

(51) Int. Cl.
*G06V 10/60* (2022.01)
*G06V 10/44* (2022.01)
(Continued)

(52) U.S. Cl.
CPC ............ *G06V 10/60* (2022.01); *G06V 10/443* (2022.01); *G06V 10/751* (2022.01); *G06V 20/46* (2022.01)

(58) Field of Classification Search
CPC ..... G06T 15/506; G06T 15/20; G06T 15/503; G06T 15/55; G06T 15/60;
(Continued)

(56) References Cited

U.S. PATENT DOCUMENTS 6,628,298 B1 * 9/2003 Debevec ............... G06T 15/506
345/632
11,164,366 B2 * 11/2021 Chen ....................... G06T 19/20
(Continued)

FOREIGN PATENT DOCUMENTS

WO  2018076038 A1  5/2018

OTHER PUBLICATIONS

C. LeGendre, et al., "DeepLight: Learning Illumination for Unconstrained Mobile Mixed Reality," In 2019 IEEE/CVF Conference on Computer Vision and Pattern Recognition (CVPR), Long Beach, CA, USA, 2019 pp. 5911-5921. doi: 10.1109/CVPR.2019.00607 (Year: 2019).*

(Continued)

*Primary Examiner* — Ian L Lemieux
(74) *Attorney, Agent, or Firm* — Brake Hughes Bellermann LLP

(57) ABSTRACT

An example method, apparatus, and computer-readable storage medium are provided to predict high-dynamic range (HDR) lighting from low-dynamic range (LDR) background images. In an example implementation, a method may include receiving low-dynamic range (LDR) background images of scenes, each LDR background image captured with appearance of one or more reference objects with different reflectance properties; and training a lighting esti- (Continued)

mation model based at least on the received LDR background images to predict high-dynamic range (HDR) lighting based at least on the trained model. In another example implementation, a method may include capturing a low-dynamic range (LDR) background image of a scene from an LDR video captured by a camera of the electronic computing device; predicting high-dynamic range (HDR) lighting for the image, the predicting, using a trained model, based at least on the LDR background image; and rendering a virtual object based at least on the predicted HDR lighting.

21 Claims, 7 Drawing Sheets

(51) Int. Cl.
*G06V 10/75* (2022.01)
*G06V 20/40* (2022.01)

(58) Field of Classification Search
CPC .......... G06T 2207/20208; G06T 5/009; G06V 10/443; G06V 10/60; G06V 10/751; G06V 20/46; H04N 5/265; H04N 23/698; H04N 23/71; H04N 23/741; H04N 23/80
See application file for complete search history.

(56) References Cited

U.S. PATENT DOCUMENTS

| | | | | |
|---|---|---|---|---|
| 2013/0093883 | A1* | 4/2013 | Wang | G01N 21/55 348/142 |
| 2014/0268160 | A1* | 9/2014 | Debevec | G01B 11/30 315/291 |
| 2015/0146972 | A1* | 5/2015 | Lalonde | G06V 10/60 382/155 |
| 2016/0150143 | A1 | 5/2016 | Matthews et al. | |
| 2016/0224861 | A1* | 8/2016 | Vogh, Jr. | G06V 10/56 |
| 2018/0047208 | A1* | 2/2018 | Marin | H04N 13/133 |
| 2018/0253869 | A1* | 9/2018 | Yumer | G06T 11/60 |
| 2018/0359416 | A1* | 12/2018 | Hold-Geoffroy | G06V 10/82 |
| 2019/0164261 | A1* | 5/2019 | Sunkavalli | G06N 3/045 |
| 2019/0325640 | A1* | 10/2019 | Jiddi | G06T 17/00 |
| 2020/0186714 | A1* | 6/2020 | Hold-Geoffroy | G06V 10/82 |
| 2021/0133929 | A1* | 5/2021 | Ackerson | G06T 9/001 |
| 2021/0295592 | A1* | 9/2021 | von Cramon | G06T 17/00 |
| 2022/0027659 | A1* | 1/2022 | LeGendre | H04N 23/611 |
| 2023/0343025 | A1* | 10/2023 | Ha | G06V 10/761 |
| 2023/0360182 | A1* | 11/2023 | Fanello | G06T 5/92 |

OTHER PUBLICATIONS

P. Debevec et al., "Acquiring the reflectance field of a human face," In Proceedings of the 27th annual conference on Computer graphics and interactive techniques, pp. 145-156. ACM Press/Addison-Wesley Publishing Co., 2000. (Year: 2000).*
D. Mandl et al., "Learning Lightprobes for Mixed Reality Illumination," 2017 IEEE International Symposium on Mixed and Augmented Reality (ISMAR), Nantes, France, 2017, pp. 82-89, doi: 10.1109/ISMAR.2017.25. (Year: 2017).*
International Search Report and Written Opinion for PCT Application No. PCT/US2019/061877, mailed on Feb. 3, 2020, 12 pages.
"ARDirectionalLightEstimate", Apple Developer (https://developer.apple.com/documentation/arkit/ardirectionallightestimate), retrieved Jul. 3, 2024, 3 pages.
"ARLightEstimate", Apple Developer, (https://developer.apple.com/documentation/arkit/arlightestimate), retrieved Jul. 3, 2024, 2 pages.
"EnvironmentTexturing", Apple Developer (https://developer.apple.com/documentation/arkit/arworldtrackingconfiguration/2977509-environmenttexturing), retrieved Jul. 3, 2024, 2 pages.
Debevec, et al., "A Single-Shot Light Probe", USC Institute for Creative Technologies (http://gl.ict.usc.edu/Research/SSLP/), Sep. 3, 2012, 2 pages.
Gardner, et al., "Learning to Predict Indoor Illumination from a Single Image", Arxiv.org (https://arxiv.org/abs/1704.00090), Nov. 21, 2017, 14 pages.
Hold-Geoffroy, et al., "Deep Outdoor Illumination Estimation", Arxiv.org (https://arxiv.org/pdf/1611.06403), Apr. 11, 2018, 10 pages.
Mandl, et al., "Learning Lightprobes for Mixed Reality Illumination", https://www.labri.fr/perso/vlepetit/pubs/mandl_ismar17.pdf, Dec. 9, 2017, 8 pages.
Wang, et al., "Joint Material and Illumination Estimation from Photo Sets in the Wild", Ucl, 3DV 2018, (https://geometry.cs.ucl.ac.uk/projects/2018/joint-material-illumination-estimation/), 2018, 8 pages.
Weber, et al., "Learning to Estimate Indoor Lighting from 3D Objects", Arxiv.org (https://arxiv.org/abs/1806.03994), Aug. 13, 2018, 9 pages.
Zhang, et al., "Learning High Dynamic Range from Outdoor Panoramas", Arxiv.org (https://arxiv.org/abs/1703.10200), Nov. 7, 2017, 10 pages.

* cited by examiner

DEEP LIGHT DESIGN

CROSS REFERENCE TO RELATED APPLICATION

This application is a 35 U.S.C. § 371 National Phase Entry Application from PCT/US2019/061877, filed Nov. 15, 2019, designating the U.S., which is a continuation of, and claims the benefit of U.S. Provisional Application No. 62/768,042, filed Nov. 15, 2018, the disclosures of which are incorporated herein by reference in their entireties.

TECHNICAL FIELD

This description relates to augmented reality (AR), and in particular, lighting for AR.

BACKGROUND

Augmented Reality (AR) has challenges similar to post production visual effects. Some examples include rendering a virtual object into a real scene in AR to add animated characters for entertainment and adding a digital actor, a creature, a prop, or a vehicle to a scene to tell the story. In both visual effects and AR, the main challenges for inserting a synthetic object into a scene are matching camera viewpoint and lighting. Matching the camera viewpoint can be performed in real time using algorithms based on simultaneous localization and mapping (SLAM) in AR toolkits. However, matching the lighting is more challenging.

SUMMARY

An example method, apparatus, and computer-readable storage medium are provided to predict high-dynamic range (HDR) lighting from low-dynamic range (LDR) background images.

In an example implementation, a method is described which may include receiving, at a computing device, low-dynamic range (LDR) background images of scenes, each LDR background image captured with appearance of one or more reference objects with different reflectance properties; and generating, at the computing device, a lighting estimation model based at least on the received LDR background images to predict high-dynamic range (HDR) lighting based at least on the generated lighting estimation model.

In another example implementation, a method is described which may include capturing, at an electronic computing device, a low-dynamic range (LDR) background image of a scene from an LDR video captured by a camera of the electronic computing device; predicting, at the electronic computing device, high-dynamic range (HDR) lighting for the image, the predicting, using a generated lighting estimation model, based at least on the LDR background image; and rendering, at the electronic computing device, a virtual object based at least on the predicted HDR lighting.

In another example implementation, a computer program product tangibly embodied on a non-transitory computer-readable medium is described which may include instructions that, when executed, are configured to cause at least one processor to receive low-dynamic range (LDR) background images of scenes, each LDR background image captured with appearance of one or more reference objects with different reflectance properties; and generating a lighting estimation model based at least on the received LDR background images to predict high-dynamic range (HDR) lighting based at least on the generated lighting estimation model.

In another example implementation, a system is described which may include at least one processor; and memory storing instructions that, when executed by the at least one processor, cause the system to receive low-dynamic range (LDR) background images of scenes, each LDR background image captured with appearance of one or more reference objects with different reflectance properties; and generate a lighting estimation model based at least on the received LDR background images to predict high-dynamic range (HDR) lighting based at least on the generated lighting estimation model.

In another example implementation, a computer program product tangibly embodied on a non-transitory computer-readable medium is described which may include instructions that, when executed, are configured to cause at least one processor to capture a low-dynamic range (LDR) background image of a scene from an LDR video being captured by a camera of the electronic computing device; predict high-dynamic range (HDR) lighting for the image, the predicting, using a generated lighting estimation model, based at least on the LDR background image; and render, at the electronic computing device, a virtual object based at least on the predicted HDR lighting.

In another example implementation, a system is described which may include a camera configured to capture a plurality of frames; at least one processor; and memory storing instructions that, when executed by the at least one processor, cause the system to capture, at an electronic computing device, a low-dynamic range (LDR) background image of a scene from an LDR video being captured by a camera of the electronic computing device; predict, at the electronic computing device, high-dynamic range (HDR) lighting for the image, the predicting, using a generated lighting estimation model, based at least on the LDR background image; and rendering, at the electronic computing device, a virtual object based at least on the predicted HDR lighting.

BRIEF DESCRIPTION OF THE DRAWINGS

Example implementations will become more fully understood from the detailed description given herein below and the accompanying drawings, wherein like elements are represented by like reference numerals, which are given by way of illustration only and thus are not limiting of the example implementations.

It should be noted that these Figures are intended to illustrate the general characteristics of methods, structure, or materials utilized in certain example implementations and to supplement the written description provided below. These drawings are not, however, to scale and may not precisely reflect the precise structural or performance characteristics of any given implementation, and should not be interpreted as defining or limiting the range of values or properties encompassed by example implementation. The use of similar or identical reference numbers in the various drawings is intended to indicate the presence of a similar or identical element or feature.

DETAILED DESCRIPTION

The present disclosure describes a mechanism to predict high-dynamic range (HDR) lighting from a low-dynamic range (LDR) camera feedback of a mobile device. In some implementations, the mechanism for estimating the HDR lighting may be based on a generated (e.g., trained) machine learning (ML) model. Although the disclosure describes training a model, the training is just one example of generating the model.

The data for training (referred to as training data) the ML model may include LDR images of a scene (or scenes) captured by a mobile device. In an example implementation, the LDR images may be captured with at least two reference objects (e.g., reflective spheres) in the scene. The reference objects, held within a bottom portion of camera's field of view (FOV), may be coated with different materials such that they have different/diverse reflectance properties. The reflectance properties of the reference objects may be defined by bidirectional reflectance distribution functions (BRDFs). The different BRDFs may reveal different cues which may be used to determine a scene's ground truth illumination. In another example implementation, one reference object with at least two different reflectance properties may be used to capture the LDR images with different cues. For example, the one reference object may be spliced together from two different reference objects with different reflectance properties.

The mechanism to predict HDR lighting may further include training the ML model to predict HDR lighting based on rendering the spheres with the predicted HDR lighting and comparing the rendered appearances of the spheres with ground truth images of the spheres rendering the appearance of the spheres and comparing with the ground truth appearances of the spheres as captured in the LDR images.

In addition, during inference, realistic rendering of virtual objects into real scenes for mobile mixed reality may be achieved using the trained ML model. The inference may be run at interactive frame rates on a mobile device to provide better user experience, which may be in/near real-time.

Figure 1:
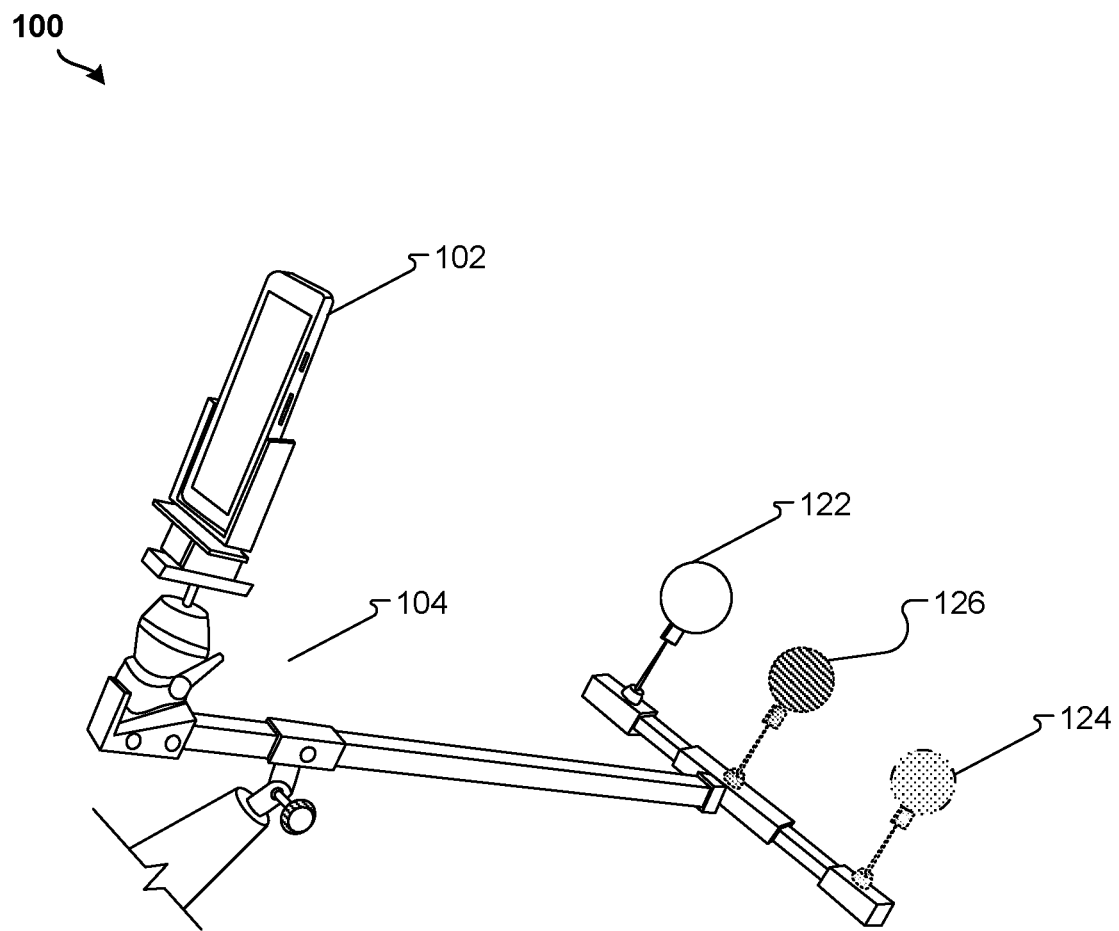
FIG. 1 illustrates a block diagram of an apparatus for acquiring training data, according to an example implementation.

FIG. 1 illustrates a block diagram of an apparatus 100 for acquiring training data, according to an example implementation.

The apparatus, in an example implementation, may include a mobile device 102, a mounting mechanism 104, and reference objects, e.g., reference spheres 122, 124, and 126. The reference spheres may be referred to as spheres in the present disclosure. The mounting mechanism 104 may be used to secure mobile device 102 such that the sphere-to-device (or device-to-sphere) distance is fixed to stabilize the positions of the spheres in images captured by the mobile device. The spheres may be held within a bottom portion of camera's field of view (FOV) such that most of the background in the background images captured by the camera is unoccluded (e.g., not blocked by the spheres).

The reference spheres, e.g., spheres 122, 124, and 126, in some implementations, may be coated with materials that modulate light (e.g., incident light) differently. For example, reference sphere 122 may be a mirrored ball (MB) sphere, reference sphere 124 may be a matte silver (MS) sphere, and reference sphere 126 may be a diffuse gray (D) sphere. In an example implementation, the materials of the spheres are chosen so that they have different BRDFs which define how much light is reflected at an opaque surface and the angles the light is reflected. A BRDF includes reflectivity and roughness, which are orthogonal. The reflectivity indicates percentage of incident light reflected and roughness indicates whether the reflections are sharp and mirror-like or dull/matte/glossy (e.g., frosted glass). For example, an object can have a sharp (non-rough) BRDF with low reflectivity or high reflectivity. In an example implementation, one reference object (or reference sphere) may be an object with a rough BRDF and another reference object may a sharp, mirror-like object. For example, the BRDFs of the reflective spheres 122, 124, and 126 may be selected such that the reflective spheres may reflect around 80%, 60%, and 35% of the total incident light, respectively. A reference sphere with higher reflectivity may reflect higher percentage of light when compared to a reference sphere with a lower reflectivity. Additionally, a reference sphere with a certain "rough" BRDF may reflect light diffusely in all directions, while a reference sphere with a "sharp" BRDF may reflect light predominantly in the specular direction, like a mirror-coated surface. The mirrored ball (MB) sphere with a sharp BRDF 122 may reflect omnidirectional, high-frequency lighting. However, in a single exposure, bright light reflections may saturate the sensor and their intensity and color may be misrepresented. The diffuse gray (D) sphere with its "rough" BRDF 126 reflects blurred, low-frequency lighting, but captures a relatively complete record of the total light in the scene and its generally directionality. The matte silver sphere (MS) 124 may reflect medium frequency illumination, e.g., with a BRDF with roughness and reflectivity in between those of the mirror and diffuse spheres.

In an additional example implementation, apparatus 100 may include two reference objects, e.g., reference spheres, 122 and 126. In an additional example implementation, apparatus 100 may include one reference object with multiple reflectance properties.

Mobile device 102 may capture LDR images so that they can be used as input to the ML model. Therefore, mobile device 102 may capture portrait HD (1080×1920) video at 30 fps, rather than static photographs. This may increase the acquisition speed of the training data compared with HDR panoramic photography, enabling the capture of millions of training images. In some implementations, for example, the videos may feature automatic exposure and white balance to disambiguate color, reflectance, and illumination. The LDR images captured by mobile device 102 for training data may include images of real-life environment, both indoor and outdoor images.

In some implementations, for example, the mobile device 100 may be a head mounted display (HMD) device, AR glasses, a smart device, etc.

Figures 2A, 2B:
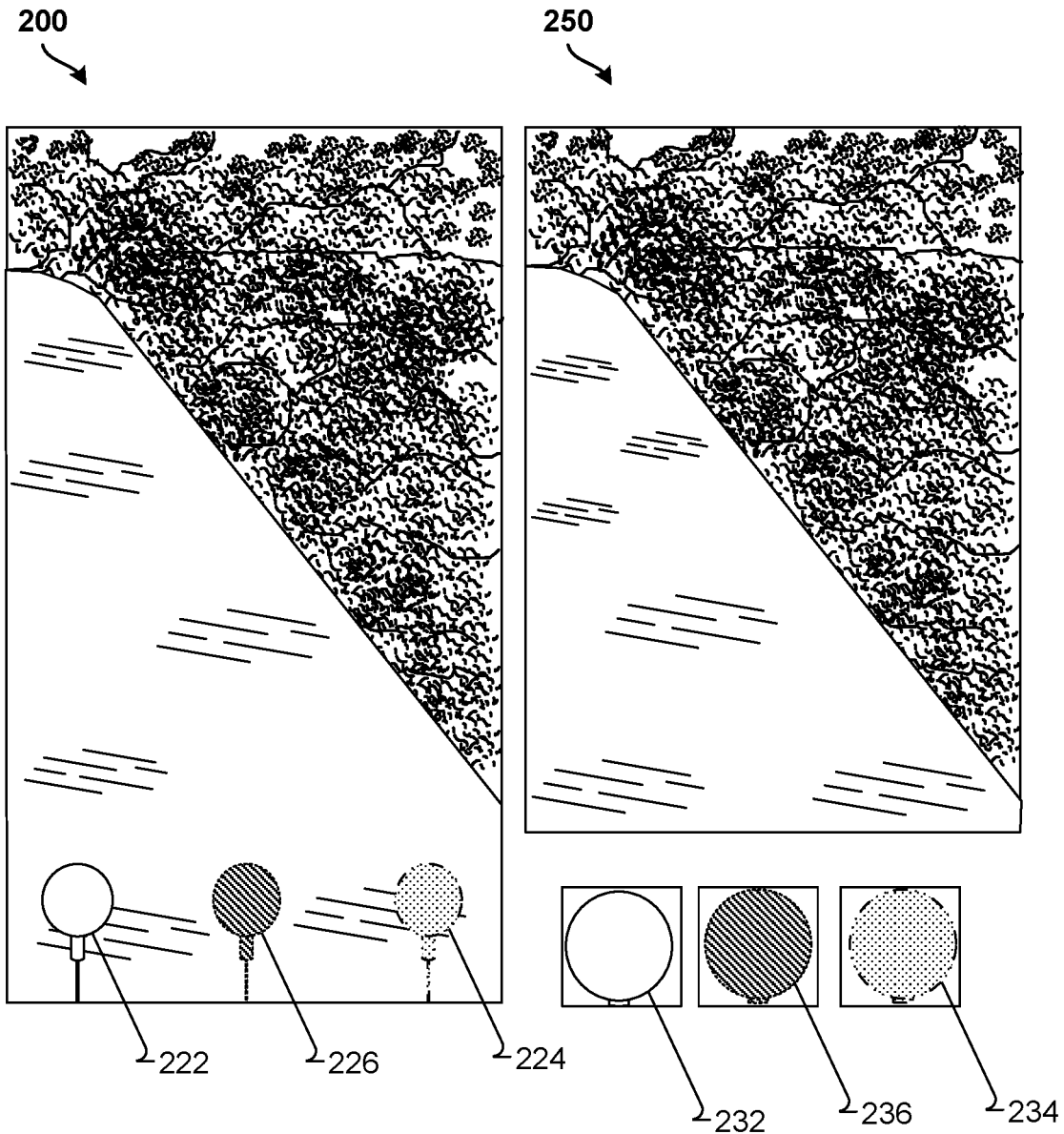
FIG. 2A illustrates an example LDR image of a scene captured by a camera of the mobile device, according to an example implementation.
FIG. 2B illustrates an example processed LDR image, according to an example implementation. The locations of the reference spheres in each image (or video frame) may be located by detecting circular boundaries in the optical flow field between neighboring frames or by using marker-bases tracking.

FIG. 2A illustrates an example LDR image 200 of a scene captured by a camera of the mobile device, according to an example implementation.

Traditional omnidirectional environment map or HDR lighting acquisition requires photographing an environment from at least two opposite views with a fisheye lens, making it difficult to sample the lighting in all directions in various locations efficiently. In addition, HDR imaging requires a user to capture the scene with multiple exposures. These procedures would make acquiring a large volume of ground truth lighting environments slow.

The video feedback, e.g., video, captured by a rear-facing camera (or an imaging sensor) of mobile device 102 may be used to collect a large volume of training data, e.g., LDR images, for the model. But the video may be constrained by limited field of view (FOV) and the video may be shot at a rate of single exposure per frame and the video data represented by, for example, 8-bit LDR. The present disclosure describes capturing LDR images with reflective spheres with measured/known BRDFs under diverse lighting conditions.

In an example implementation, LDR image 200 illustrates a background image with reference objects (e.g., spheres 222, 224, and 226 which may be same as or similar to spheres 122, 124, and 126, respectively) in the scene. The reference objects may have different BRDFs for revealing different lighting cues. In some implementations, the different lighting cues may be used to generate ground truth images or images with ground truth lighting (or ground illumination). The ground truth lighting may be described as lighting that would be captured, for example, if state-of-art light measurement techniques are used and/or an RGB pixel is used to represent light for every possible light direction. The LDR images are collected such that reflective spheres are located at the bottom portion of the camera's FOV, while occluding as little of the background as possible.

The mobile device may be used to collect images, both indoor and indoor, so that the ML model may be trained with different sets of images for better performance.

FIG. 2B illustrates an example processed LDR image 250, according to an example implementation. The locations of the reference spheres in each image (or video frame) may be located by detecting circular boundaries in the optical flow field between neighboring frames or by using marker-based tracking.

In some implementations, the images of the reference spheres may be cropped and the cropped images of the spheres may be re-sampled using an idealized camera model oriented towards the sphere center with a view frustum tangent to the sphere on all four sides to eliminate perspective distortion, as shown in FIG. 2B, to generate processed images of the spheres, as shown by 232, 234, and 236. For example, in the background image 200, the lower 20% may be removed during training (and bottom 20% of the images captured by a mobile device during interference) as shown in 250 of FIG. 2B. In other words, the final training data may include cropped background images, each paired with a set of cropped spheres, one per BRDF.

Figure 3:
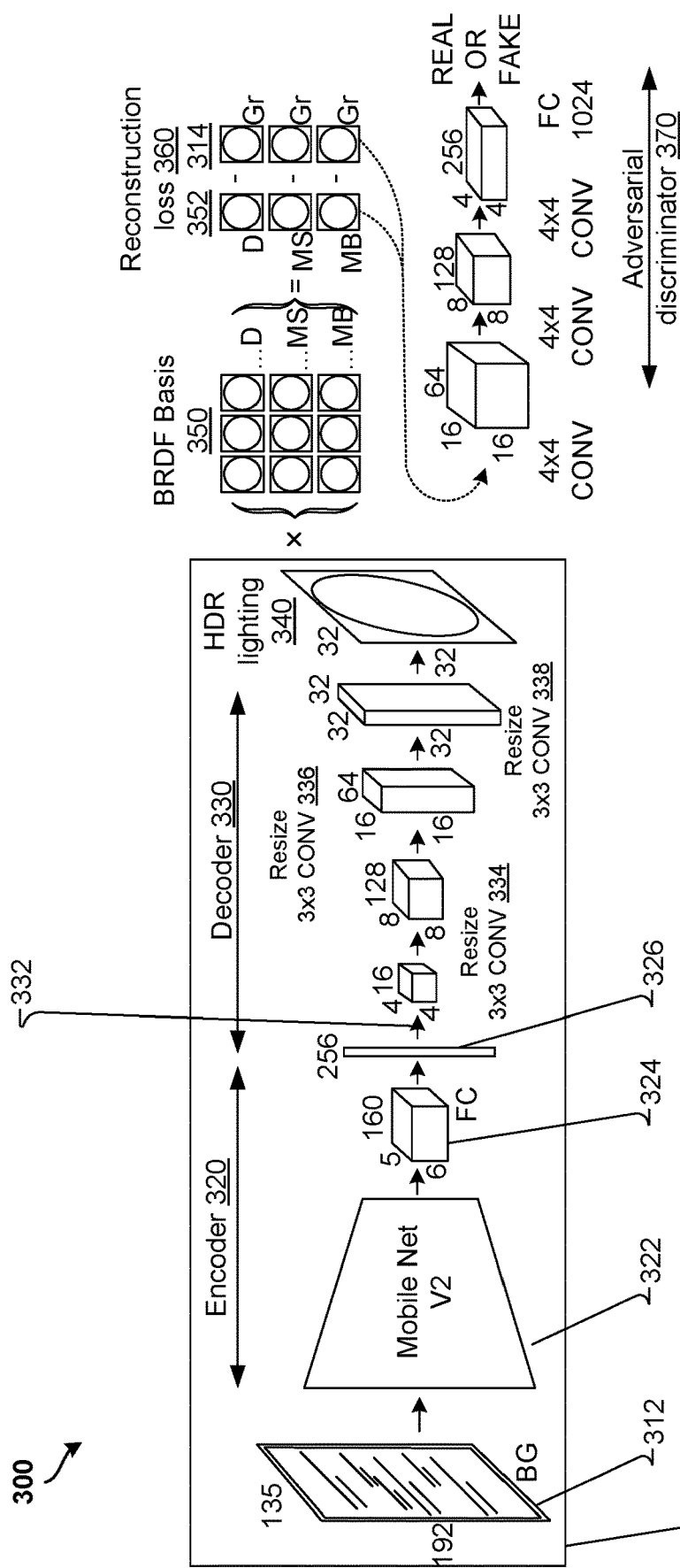
FIG. 3 illustrates a network to predict high dynamic range (HDR) lighting, according to an example implementation.

FIG. 3 illustrates a network 300 to predict high dynamic range (HDR) lighting, according to an example implementation.

In some implementations, for example, the input to a model 310 may be LDR background images, e.g., LDR background image 312. The background image 312 may be an unconstrained LDR image captured by a rear-facing or outward, world-facing camera of a device, for example, a rear-facing camera of device 102 of FIG. 1. In an example implementation, the LDR background image 312 may be resized from a native cropped resolution of 1080×1536 to 135×192 and with pixel values normalized to a range of [−0.5, 0.5]. The resizing of the input image may contribute to faster inference times (more frequent and faster lighting predictions) and/or the normalizing of the input imagery may contribute to ease of training the ML model.

The output of model 310 may be HDR lighting 340. In an example implementation, HDR lighting 340 may be predicted (e.g., estimated, approximated, etc.) based at least on the input LDR background images. The LDR background images 312 may be include one or more reflective spheres as described in detail above in reference to FIGS. 1, 2A, and 2B.

The architecture of model 310, in an example implementation, may be an encoder-decoder type, where encoder 320 may include fast depthwise-separable convolutions. For example, encoder 320 may include a MobileNetV2 322 to improve the performance of model 310 as MobileNetV2 powers mobile vision applications including classification, object detection, and/or semantic segmentation. In some implementations, for example, the first 17 MobileNetV2 layers may be used to generate feature maps, which may map a data vector to feature space and referred to as output feature maps, which may be processed with a fully-connected (FC) layer 324 to generate a latent vector 326 (e.g., latent vector of size 256). In some implementations, the number of layers of MobileNetV2 used may partially depend on the size of the input image (e.g., more layers may be used for larger input images) and the number of layers may be selected to optimize speed.

Decoder 330 may reshape 332 and upsample latent vector 326, e.g., three times (334, 336, 338) by a factor of two, to generate a 32×32 a color image, which may be predicted HDR lighting 340. In some implementations, for example, the model 310 may be a deep neural network, e.g., convolutional neural network (CNN). The model may be trained to represent HDR lighting in various formats, e.g., omnidirectional light, spherical harmonics, light probe images, spherical Gaussians, Cosine Lobes, etc.

In an example implementation, image-based relighting 350 may be performed using predicted HDR lighting 340 to perform differentiable rendering 352 of the spheres (e.g., 232, 234, and 236). In other words, a rendering function may be used to render the spheres using the predicted HDR lighting during the training of the model. Image-based relighting may include multiplication and addition operations as light is additive. Other differentiable rendering functions may be used as well.

At 360, the rendered images of the three spheres may be compared with ground truth images 362 to compute the difference between the images. The difference between rendered images 352 and ground truth images 314 may be considered as reconstruction loss 360 used for training the model. Optionally, in some implementations, for example, an adversarial discriminator 370 may be used for at least the reflective object with the highest BRDF, e.g., mirrored ball (MB) sphere 122. In other words, network 300 may be trained by minimizing reconstruction loss between ground truth sphere images and rendered spheres lit with the predicted HDR lighting. Optionally, in some implementations, for example, an adversarial loss for one or more of the reference objects may be added to ensure inference of plausible high-frequency illumination.

Alternately, in some implementations, for example, given the training data imagery embedded with one or more reference objects with two or more reflectance properties, the closest "ground truth" HDR lighting that would have produced the appearance of the one or more reference objects may be directly estimated using a linear or non-linear solver system, taking the images or appearances of the one or more reference objects as input. This can be thought of as estimating HDR lighting given only reference object appearances (in a single exposure image), and not from the background live camera feed. Then, a computer machine learning model may be trained to estimate HDR omnidirectional lighting from only a single low dynamic range input background image again, this time the training achieved through comparison not with renderings, but directly with the "ground truth" HDR lighting estimated earlier, as described in the beginning of this paragraph. In other words, in some implementations, for example, the HDR lighting may be predicted off the reference objects directly and then using that as "ground truth" during training.

Thus, machine learning techniques may be used to train a model that can estimate environmental lighting based on LDR images from a camera feed of a mobile device. The estimated lighting may be used by a user to illuminate and integrate an AR object realistically into a scene.

Figure 4:
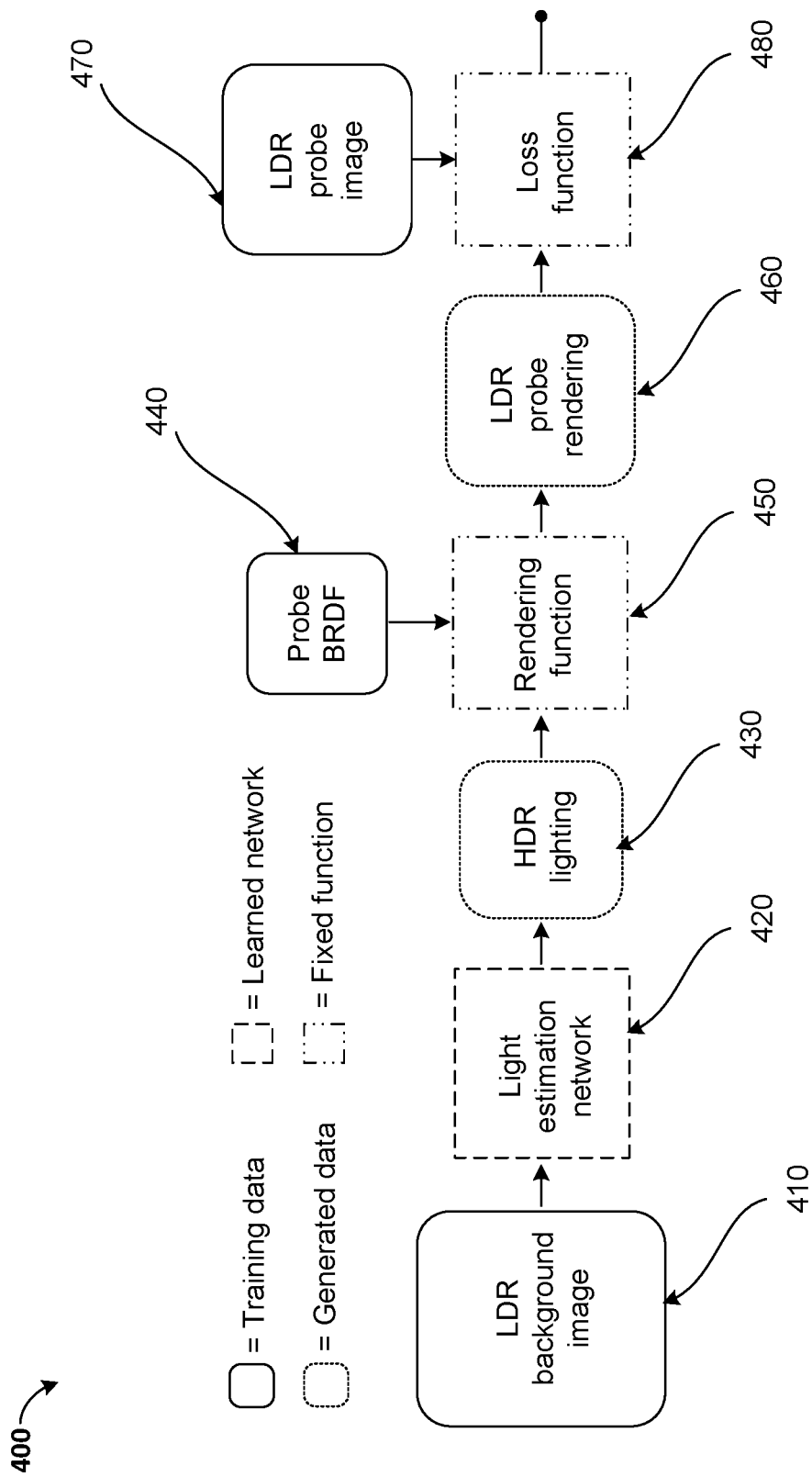
FIG. 4 illustrates an example network for predicting HDR lighting, according to an example implementation.

FIG. 4 illustrates an example network 400 for predicting HDR lighting, according to an example implementation.

In an example implementation, FIG. 4 includes an LDR background image 410, a light estimation network 420, HDR lighting 430, a probe BRDF 440, a rendering function 450, LDR probe rendering 460, an LDR probe image 470, and/or a loss function 480.

Based on the description above in reference to FIGS. 1-3, LDR background image 410 may be similar to (or same as) LDR background image 312, light estimation network 420 may be similar to (or same as) model 310, HDR lighting 430 may be similar to (or same as) HDR lighting 340, probe BRDF 440 may be similar to (or same as) reflective spheres for measuring light (e.g., FIG. 2A), rendering function 450 may be similar to (or same as) image-based lighting using BRDF basis 350, LDR probe rendering 460 may be similar to (or same as) rendering 352, LDR probe image 470 may be similar to (or same as) ground truth images 314, and/or loss function 480 may be similar to (or same as) to reconstruction loss 360.

Figure 5:
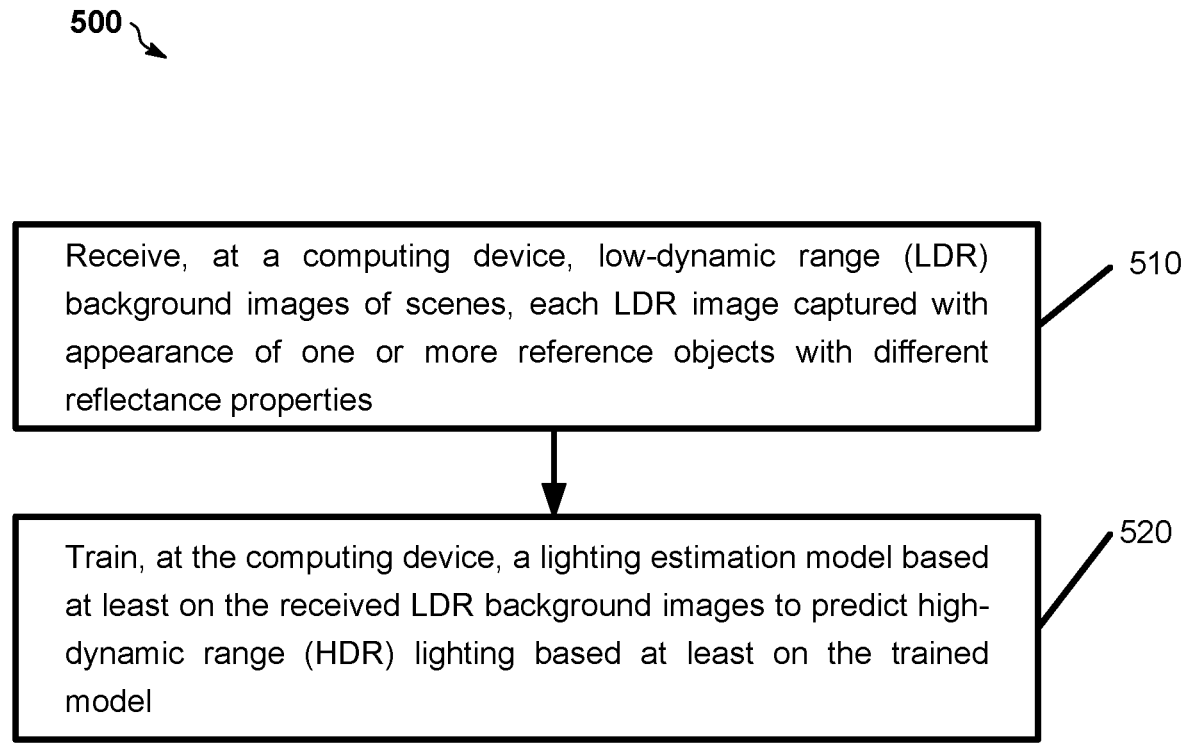
FIG. 5 is a flow chart illustrating estimation of HDR lighting, according to an example implementation.

FIG. 5 is a flow chart 500 illustrating estimation of HDR lighting, according to an example implementation.

Figure 7:
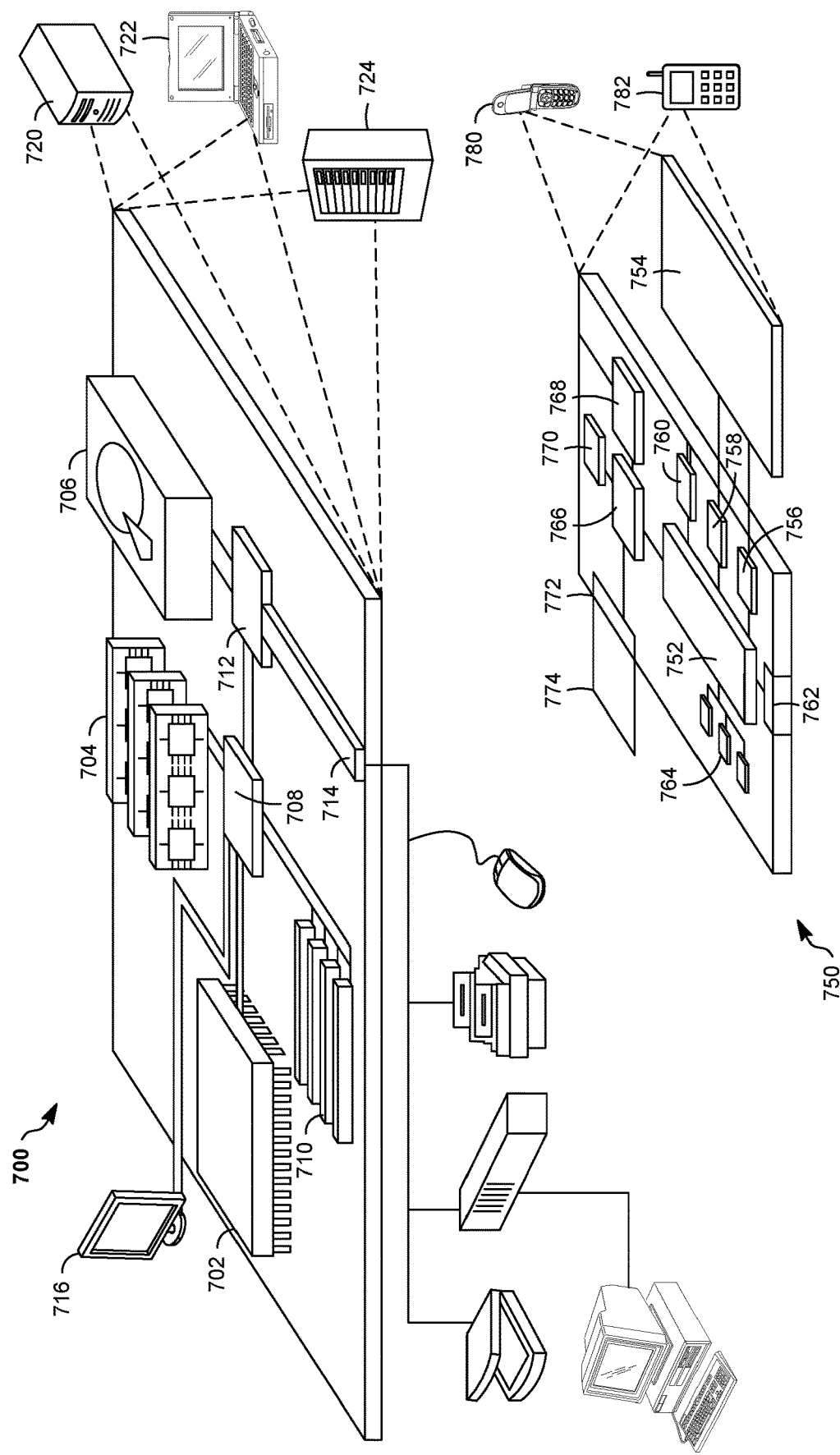
FIG. 7 illustrates an example of a computer device and a mobile computer device, which may be used with the techniques described here.

At block 510, a computing device, e.g., 700 of FIG. 7, may receive LDR background images of a scene or scenes. The computing device may receive LDR images captured by a mobile device, e.g., 102 of FIG. 1. The background images may be obtained by the mobile device from an LDR video captured by a rear-facing camera of the mobile device.

The LDR background images (also referred to as background images) may include reference objects that are captured in the image. In an example implementation, the LDR images may capture reference objects with different BRDFs, as described above in detail in reference to FIGS. 1, 2A and 2B. The reference objects, which may be spheres, with different BRDFs may reveal different lighting cues about the scene's ground truth illumination (or lighting). The ground truth illumination may be described as illumination that would be captured, for example, if state-of-art techniques are used and/or an RGB pixel is used to represent illumination from every possible light direction.

For example, in an example implementation, LDR image 200 may capture three reference objects, e.g., three spheres, 222, 224, and 226 as shown in FIG. 2A. As described above in reference to FIGS. 1-4, sphere 222 may be a mirrored ball (MB) sphere 224, a matte silver (MS) sphere 224, and/or a diffuse gray (D) sphere. Although three example spheres are illustrated in FIGS. 1-3, in some implementations, two spheres are sufficient. In an example implementation, the two spheres may be a mirrored ball (MB) sphere 222 and a diffuse gray (D) sphere 226. These two spheres with different BRDFs may reveal different lighting cues. The two spheres may be placed on either ends of the mounting mechanism or one of the spheres may be placed at the center. In an example implementation, if the spheres are closer together, their record of the lighting may more closely match one another's because they're closer to occupying the same point in space. However, the reflection of one sphere may be more visible in the other (one sphere occludes part of the real lighting environment as seen by the other sphere). In other words, there is a trade-off.

At block 520, the computing device may generate (e.g., train) a light estimation model based at least on the received LDR background images. In some implementations, for example, the computing device may predict HDR lighting 340 based at least on the trained model.

Figure 6:
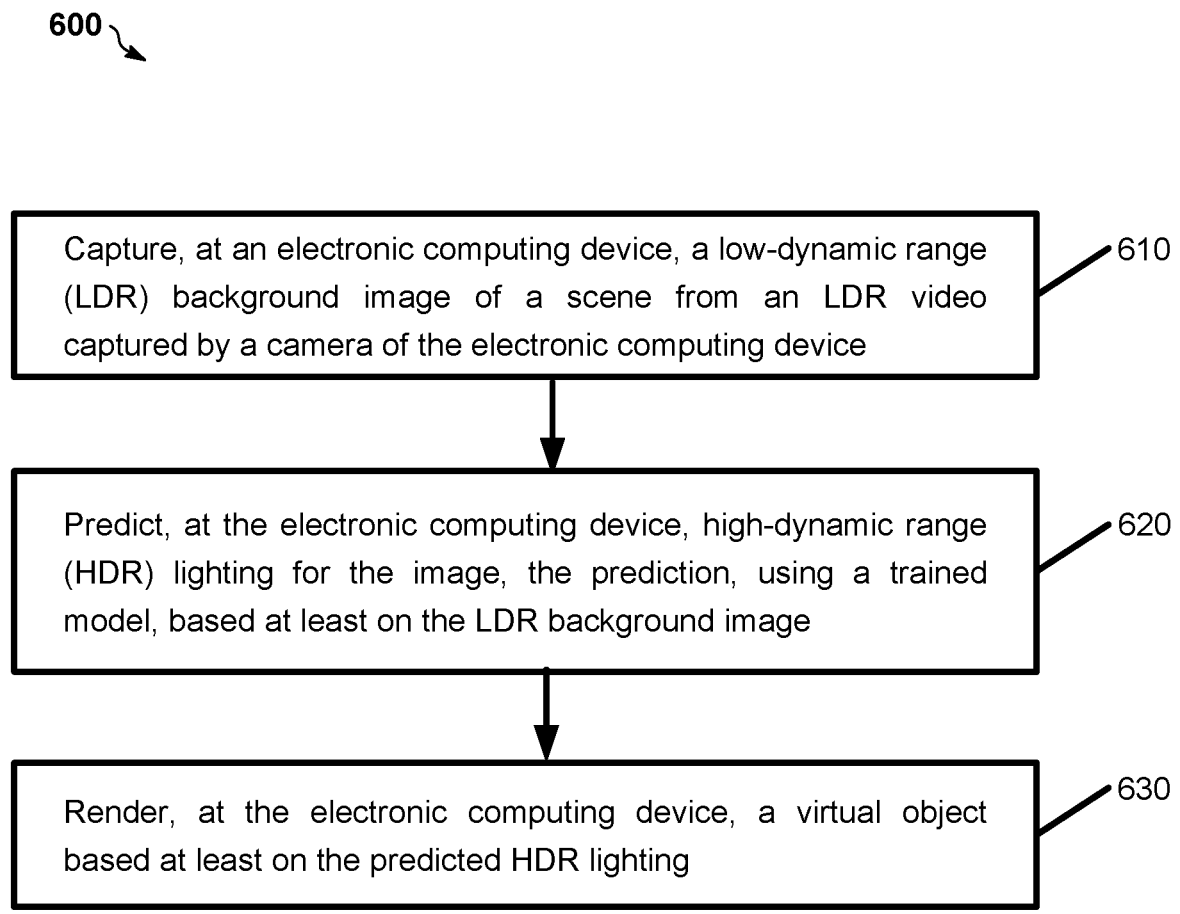
FIG. 6 is a flow chart illustrating estimation of HDR lighting, according to an additional example implementation.

FIG. 6 is a flow chart 600 illustrating estimation of HDR lighting, according to an additional example implementation.

At block 610, an electronic computing device, e.g., mobile device 750 of FIG. 7, may capture an LDR background image of a scene from an LDR video (e.g., recorded or live) captured by a camera of the electronic computing device.

At block 620, the mobile device may predict HDR lighting for the image. In some implementations, for example, the prediction may be performed using a trained model. The prediction may be based at least on the LDR background image.

At block 630, the mobile device may perform rendering of a virtual object based at least on the predicted HDR lighting. Optionally, in some implementations, for example, the mobile device may perform compositing of the rendered virtual object into the LDR video. In addition, some implementations may include showing the images as overlaid in a pass-through AR display. This provides for more plausible rendering with a real-world scene.

FIG. 7 shows an example of a computer device 700 and a mobile computer device 750, which may be used with the techniques described here. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In some implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In some implementations, the memory 704 is a volatile memory unit or units. In some implementations, the memory 704 is a non-volatile memory unit or units. The memory 704 may also be another form of computer-readable medium, such as a magnetic or optical disk.

The storage device 706 is capable of providing mass storage for the computing device 700. In some implementations, the storage device 706 may be or contain a computer-readable medium, such as a floppy disk device, a hard disk device, an optical disk device, or a tape device, a flash memory or other similar solid-state memory device, or an array of devices, including devices in a storage area network or other configurations. The computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high-speed controller 708 manages bandwidth-intensive operations for the computing device 700, while the low speed controller 712 manages lower bandwidth-intensive operations. Such allocation of functions is exemplary only. In some implementations, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 752, 754, 764, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, to enable near area communication of device 750 with other devices. External interface 762 may provide, for example, for wired communication in some implementations, or for wireless communication in some implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In some implementations, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752, that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, Wi-Fi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smart phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation In some or more computer programs that are executable and/or interpretable on a programmable system including at least one programmable processor, which may be special or general purpose, coupled to receive data and instructions from, and to transmit data and instructions to, a storage system, at least one input device, and at least one output device. Various implementations of the systems and techniques described here can be realized as and/or generally be referred to herein as a circuit, a module, a block, or a system that can combine software and hardware aspects. For example, a module may include the functions/acts/computer program instructions executing on a processor (e.g., a processor formed on a silicon substrate, a GaAs substrate, and the like) or some other programmable data processing apparatus.

Some of the above example implementations are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example implementations. Example implementations, however, be embodied in many alternate forms and should not be construed as limited to only the implementations set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example implementations. As used herein, the term and/or includes any and all combinations of one or more of the associated listed items.

It will be understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular implementations s only and is not intended to be limiting of example implementations. As used herein, the singular forms a, an, and the are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example implementations belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example implementations and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative implementations, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device or mobile electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example implementations are typically encoded on some form of non-transitory program storage medium or implemented over some type of transmission medium. The program storage medium may be magnetic (e.g., a floppy disk or a hard drive) or optical (e.g., a compact disk read only memory, or CD ROM), and may be read only or random access. Similarly, the transmission medium may be twisted wire pairs, coaxial cable, optical fiber, or some other suitable transmission medium known to the art. The example implementations not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or implementations herein disclosed irrespective of whether or not that particular combination has been specifically enumerated in the accompanying claims at this time.

While example implementations may include various modifications and alternative forms, implementations thereof are shown by way of example in the drawings and will herein be described in detail. It should be understood, however, that there is no intent to limit example implementations to the particular forms disclosed, but on the contrary, example implementations are to cover all modifications, equivalents, and alternatives falling within the scope of the claims. Like numbers refer to like elements throughout the description of the figures.

What is claimed is:

1. A method, comprising:
   capturing, at an electronic computing device, an input low-dynamic range (LDR) image of a scene from an LDR video captured by a camera of the electronic computing device;
   predicting high-dynamic range (HDR) lighting for an image using a lighting estimation model,
      the lighting estimation model being generated based on a first LDR image captured with a first reference object with a first bidirectional reflectance distribution function (BRDF) and a second reference object with a second BRDF different from the first BRDF,
      the second LDR image being captured with the first reference object and with the second reference object, the first LDR image being based on a lighting condition different from a lighting condition of the second LDR image; and
   rendering a virtual object based at least on the HDR lighting.

2. The method of claim 1, further comprising:
   compositing, at the electronic computing device, the rendered virtual object into the LDR video.

3. The method of claim 1, wherein the LDR video is captured by a rear-facing camera of the electronic computing device.

4. The method of claim 1, wherein the first LDR image is a first LDR background image.

5. The method of claim 1, wherein the first reference object has a reflectance at least two times greater than a reflectance of the second reference object.

6. The method of claim 1, wherein the lighting condition of the first LDR image is an outdoor lighting condition, the lighting condition of the second LDR image is an indoor lighting condition.

7. A computer program product tangibly embodied on a non-transitory computer-readable medium and comprising instructions that, when executed, are configured to cause at least one processor to:
   receive a first low-dynamic range (LDR) image and a second LDR image,
      the first LDR image being captured with a first reference object with a first bidirectional reflectance distribution function (BRDF) and a second reference object with a second BRDF different from the first BRDF,
      the second LDR image being captured with the first reference object and with the second reference object; and
   generate a lighting estimation model, based at least on the first LDR image and the second LDR image, to predict high-dynamic range (HDR) lighting based at least on the lighting estimation model, the lighting estimation model includes an encoder portion and a decoder portion.

8. The computer program product of claim 7, wherein the first BRDF represents a reflectance property.

9. The computer program product of claim 7, wherein the first LDR image is included in a plurality of LDR images including LDR images of indoor and outdoor scenes.

10. A method, comprising:
    receiving, at a computing device, a first low-dynamic range (LDR) image of a scene and a second LDR image,
       the first LDR image being captured with a first reference object with a first bidirectional reflectance distribution function (BRDF) and a second reference object with a second BRDF different from the first BRDF,
       the second LDR image being captured with the first reference object and with the second reference object,
       the first LDR image being based on a lighting condition different from a lighting condition of the second LDR image; and
    generating a lighting estimation model, based at least on the first LDR image and the second LDR image, configured to predict high-dynamic range (HDR) lighting.

11. The method of claim 10, wherein the generating includes:
    differentially rendering an appearance of the first reference object and an appearance of the second reference object; and
    comparing a rendered image of the first reference object and a rendered image of the second reference object with a captured ground truth appearance of the first reference object and a captured ground truth appearance of the second reference object.

12. The method of claim 11, wherein differentially rendering the appearance of the first reference object and the appearance of the second reference object is based on image-based relighting.

13. The method of claim 12, wherein a lighting cue from the first reference object and a lighting cue from the second reference object are captured in a single exposure.

14. The method of claim 10, wherein the first LDR image is included in a plurality of LDR images including LDR images of indoor and outdoor scenes.

15. The method of claim 14, wherein the first BRDF represents a reflectance property.

16. The method of claim 10, wherein the first reference object is a mirrored ball (MB) reference object and the second reference object is a diffuse gray (D) reference object.

17. The method of claim 16, wherein first LDR image is captured with a third reference object with a third BRDF, the first BRDF and the second BRDF are different from the third BRDF.

18. The method of claim 17, wherein the first reference object is a mirrored ball (MB) reference object, the second reference object is a matte silver (MS), and the third reference object is a diffuse gray (D) reference object.

19. The method of claim 10, wherein the first LDR image is obtained from an LDR video.

20. The method of claim 19, wherein the LDR video is captured by a camera or an imaging sensor of a mobile device or a mobile electronic computing device.

21. The method of claim 10, wherein the first reference object and the second reference object are located at a bottom portion of a field of view (FOV) of a camera.

* * * * *

UNITED STATES PATENT AND TRADEMARK OFFICE
CERTIFICATE OF CORRECTION

PATENT NO. : 12,165,380 B2
APPLICATION NO. : 17/309206
DATED : December 10, 2024
INVENTOR(S) : LeGendre et al.

Page 1 of 1

It is certified that error appears in the above-identified patent and that said Letters Patent is hereby corrected as shown below:

On the Title Page

On Page 2, Column 2, item (56), under "OTHER PUBLICATIONS", Line 31, delete "Ucl," and insert -- UCL, --, therefor.

In the Claims

In Column 14, Claim 11, Line 62, delete "differentially" and insert -- differentiably --, therefor.

In Column 15, Claim 12, Line 3, delete "differentially" and insert -- differentiably --, therefor.

Signed and Sealed this
Twenty-fourth Day of June, 2025

Coke Morgan Stewart
*Acting Director of the United States Patent and Trademark Office*